United States Patent [19]

Prohaska

[11] Patent Number: 4,701,971
[45] Date of Patent: Oct. 27, 1987

[54] WINDSHIELD WIPER SYSTEM

[75] Inventor: Hans Prohaska, Bietigheim-Bissingen, Fed. Rep. of Germany

[73] Assignee: SWF Auto-Electric GmbH, Bietigheim-Bissingen, Fed. Rep. of Germany

[21] Appl. No.: 753,170

[22] Filed: Jul. 9, 1985

[30] Foreign Application Priority Data

Jul. 18, 1984 [DE] Fed. Rep. of Germany ....... 3426407

[51] Int. Cl.⁴ ................................................ B60S 1/26
[52] U.S. Cl. .................................................. 15/250.21
[58] Field of Search ........... 15/250.21, 250.23, 250.29, 15/250.13

[56] References Cited

U.S. PATENT DOCUMENTS 1,660,971 2/1928 Lindner ............................ 15/250.23
4,447,928 5/1984 Schüch et al. .................... 15/250.23

FOREIGN PATENT DOCUMENTS 2417128 10/1975 Fed. Rep. of Germany ... 15/250.21
2430163 1/1976 Fed. Rep. of Germany ... 15/250.21
2430831 1/1976 Fed. Rep. of Germany ... 15/250.23
2143120 2/1985 United Kingdom ............. 15/250.21

Primary Examiner—Peter Feldman
Attorney, Agent, or Firm—Donald J. Lenkszus

[57] ABSTRACT

This invention describes a wiper system for motor vehicles in which the wiper arm is radially retracted and extended during the to-and-fro motion, so that in comparison with conventional systems an enlarged wiping area is achieved. The coupled gear for retracting and extending a slide mounted in a guide member and connected with the wiper arm is arranged outside the guide member. The coupled gear drives a shaft operatively connected with the slide, which shaft is mounted in a bore of the actual drive shaft for driving the guide member in pendulum-fashion. Thereby the overall height and the weight of the guide member is reduced.

10 Claims, 5 Drawing Figures

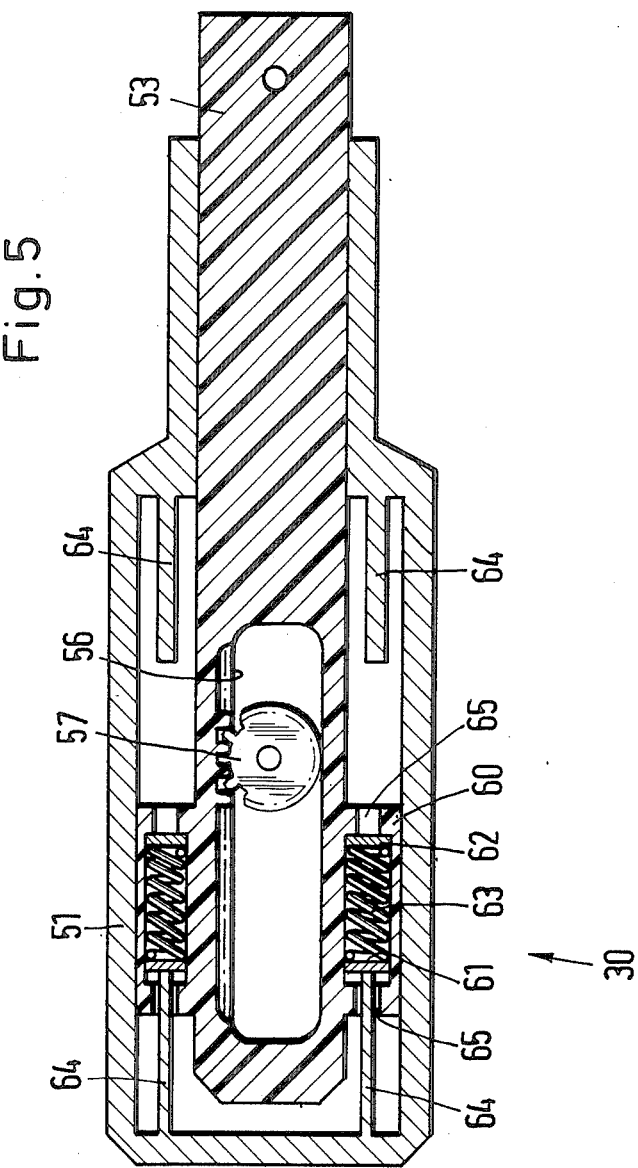

WINDSHIELD WIPER SYSTEM

BACKGROUND OF THE INVENTION

The invention pertains to a windshield wiper system of the type in which the wiper moves in a radial motion during its pendulum movement.

A wiper system of this kind, such as shown in German Pat. No. 2,417,128, is used for cleaning a window pane which is considerably wider than it is high. During half of a wiping cycle the windshield wiper is retracted and extended in the radial direction, so that corner areas of the window can be better cleaned. For moving the slide coupled with the windshield wiper to and fro a coupled gear is used which transforms a uniform rotary motion into a periodically variable motion.

According to German Pat. No. 2,417,128 this coupled gear includes a crank which drives a pinion via a toothed push rod. The pinion meshes with a portion on the slide formed in the manner of a toothed rack. The coupled gear is thereby arranged on the guide member for the slide which is driven in pendulum-fashion. This is disadvantageous, because the overall size of this guide member is also substantially determined by the length of the crank. The coupled gear adds to the mass driven in pendulum fashion which results in increased noise and to an increased strain at the reversing points of the windshield wiper. Moreover in the system of German Pat. No. 2,417,128 the motion of the crank gear is derived from the pendulum motion of the guide member. For this purpose a toothed wheel is coupled with the crank shaft. The toothed wheel meshes outside the guide member with a stationary crown gear. This construction is complicated, because the guide member must have a further bearing. Moreover this toothed wheel is subjected to strain when the pendulum motion of the guide member changes. Thereby the play of the teeth is increased, so that over time noise increases.

Although the arrangement of German Pat. No. 2,417,128 is an improvement over older solutions (compare for example the German specifications Nos. AS 1,066,890, AS 2,364,427), this system does not meet all requirements.

SUMMARY OF THE INVENTION

It is an object of the present invention to provide a wiper system in which the masses moving in pendulum-fashion are as small as possible to thereby reduce the strains and the formation of noises at the reversing points. Furthermore, it is an object of the invention that the wiper system shall be capable of being produced at favorable costs.

The invention is thereby based on the perception that the coupled gear for driving the slide can also be arranged outside the guide member and thus the overall height and the weight of the guide member moving in pendulum-fashion can be reduced, if in a bore of the drive shaft for the guide member a further shaft is mounted which is operatively connected with the slide and which is driven by the coupled gear with changing direction of rotation and with a swivelling motion of the actual drive shaft for the guide member in the same direction. Thereby the additional bearing in the guide member is also no longer necessary, via which in the known embodiment the coupled gear is drive via the pinion and the stationary crown gear outside the guide member, so that this guide member can be manufactured at more favourable costs.

U.S. Pat. No. 1,660,971 shows a wiper system in which in a bore of the drive shaft driving the wiper arm a further shaft is mounted via which a crank mechanism is operated. However in this system the wiper blade is moved relative to the wiper arm, whereas in the illustrative embodiment the whole windshield wiper is radially retracted and extended during the pendulum motion. Furthermore, in the arrangement of, in this known U.S. Pat. No. 1,660,971 the coupled gear is not arranged on the side of the bearing bushing opposite to the wiper arm and thus the shaft for driving this coupled gear with a swivelling motion in the same direction is not driven with changing direction of rotation. Thus the arrangement of U.S. Pat. No. 1,660,971 is significantly different from the subject matter of our application.

In accordance with the invention the coupled gear may be combined with the means for transmission of motion for driving the guide member in pendulum-fashion and with the drive motor to a structural unit. By this measure the production costs can be further reduced.

In accordance with the present invention it is significant the way in which the coupled gear for driving the slide is formed. However a crank gear is preferred whose crank is always driven by the drive motor in the same direction of rotation.

In the embodiment according to the prior art the direction of rotation of the crank changes, when the to-and-fro motion of the guide member and the windshield wiper changes, with the result that there can be increased wear and increased noise.

The crank gear may include a crank, a push rod articulated thereon and a rocker fixed on the shaft in a manner protected against twisting. Because it is desireable to keep the structural unit as small as possible, the push rod of the crank gear is preferably formed as a toothed rack meshing with a pinion which is seated in a manner protected against twisting on the shaft operatively connected with the slide. This embodiment has the advantage that during motion of the guide member in the same direction the slide and thereby the wiper arm is possibly moved to and fro several times.

In an embodiment of the invention in which the drive shaft for the guide member is also driven via a crank mechanism with a crank rotating in one direction of rotation, the rotation of the crank of the coupled gear for driving the slide is derived from the rotation of the crank of the crank gear for driving the guide member. This is possible if the cranks have one toothed wheel each with a pin eccentrically mounted thereon, on which the push rods are articulated.

The way in which way the rotary motion acts upon the slide is not essential to the invention. However a toothed-rack drive is preferred because only a pinion has to be fixed on the shaft in the guide member. The pinion meshes with a toothed rack fixed on the slide. The toothed rack and the slide are preferably injection-moulded as a single piece from plastic material to reduce the weight further.

Formation of noise cannot be fully prevented in the reversing positions of the slide. However to reduce this noise the motion of the slide can be damped by spring means in the area of the reversing position.

BRIEF DESCRIPTION OF THE DRAWING

The invention will be better understood from a reading of the following detailed description in conjunction with the drawing in which:

FIG. 4 is a longitudinal section through the guide member and FIG. 5 is a section taken on the line V—V of FIG. 4.

DETAILED DESCRIPTION

Figure 1:
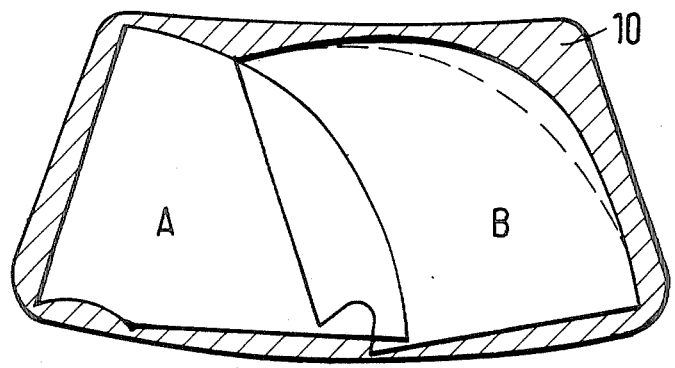
FIG. 1 is a view of a windshield of a motor vehicle.

In FIG. 1 a windshield of a motor vehicle is designated 10 on which the wiping areas A and B of two windshield wipers have been indicated. One wiper moves across the wiping area A, and is only driven in pendulum fashion between two reversing positions in known manner. However the other windshield wiper moves across the wiping area B, and is retracted and extended in the radial direction during the pendulum motion. The broken lines indicate the size of a wiping area of a wiper only driven in pendulum-fashion. It is easily seen that by means of the radially retractable and extendable wiper a larger wiping area is achieved, especially in the upper corner area. The enlarged wiping area B is assumed to be on the side of the driver.

Figure 2:
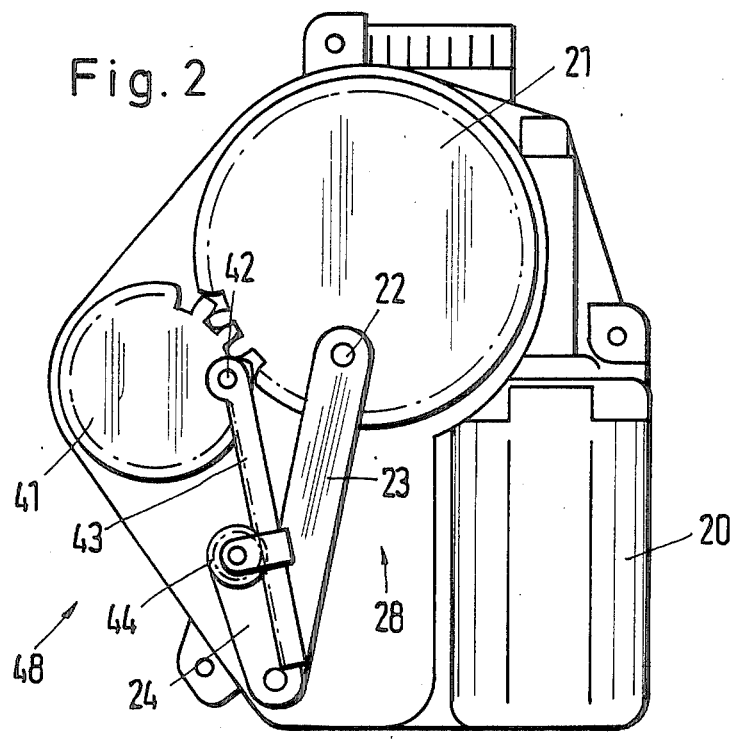
FIG. 2 is a view of a structural unit including a wiper motor, coupled gear and means for transmission of motion for driving the guide member.
Figure 4:
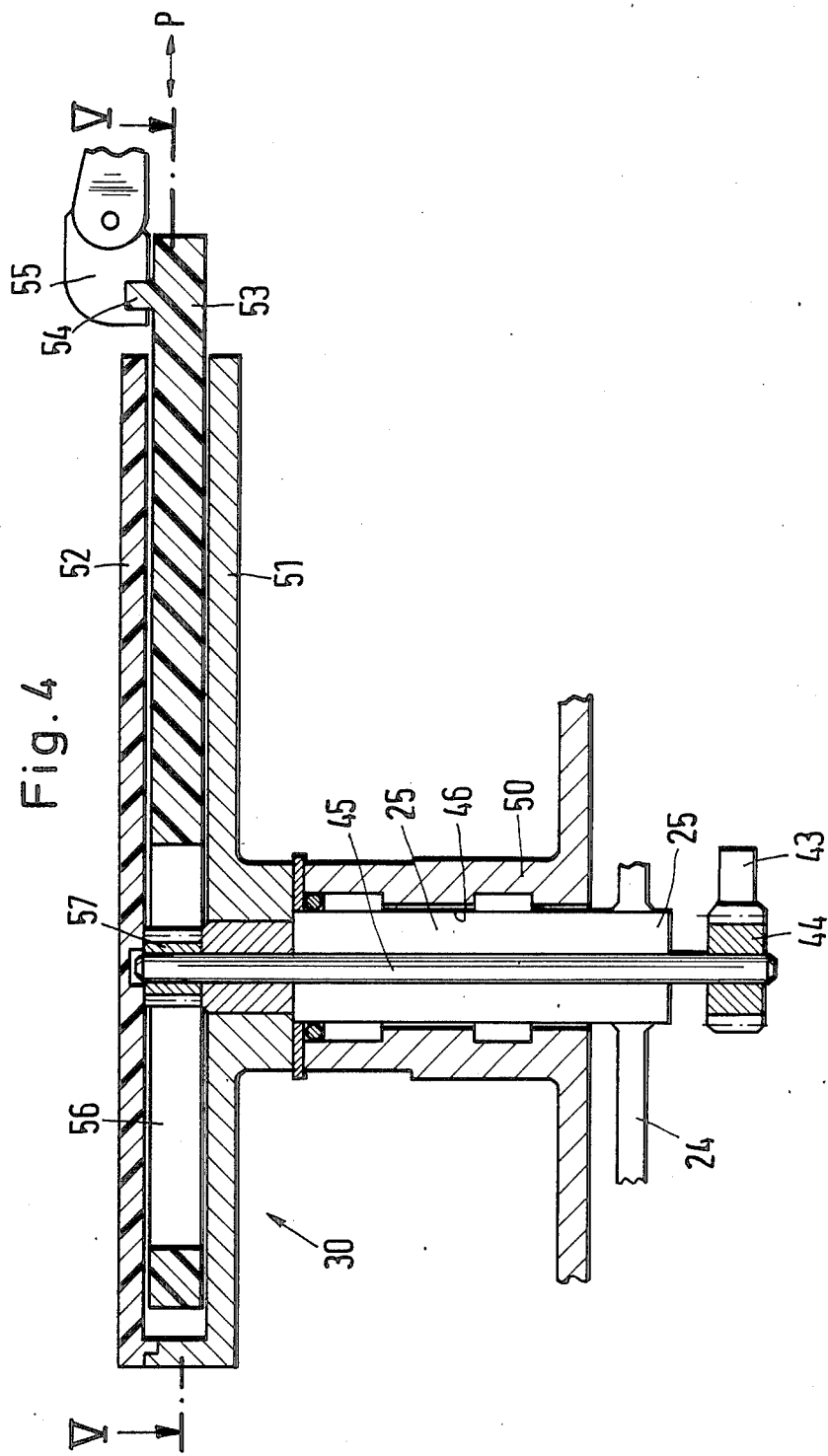

In FIG. 2 an electric drive motor 20 drives, in known manner, a worm wheel 21. A pin 22 is eccentrically mounted on this worm wheel 21. A push rod 23 is hung on pin 22. The push rod 23 is pivoted on a rocker 24 which as shown in FIG. 4 is fixed on a drive shaft 25 in a manner protected against twisting. The parts 21 and 25 form the means of transmission of motion for driving in pendulum-fashion a guide member 30 illustrated in FIGS. 4 and 5. The worm wheel 21 and the pin 22 form a crank which is always driven in the same direction of rotation.

A further toothed wheel 41 meshes with the toothed wheel 21. Wheel 41 carries a pin 42 on which is hung in a push rod 43. Push rod 43 is formed as a toothed rack and meshes with a pinion 44 which as shown in FIG. 4 is connected in a manner protected against twisting with a shaft 45 which is guided in a bore 46 of the drive shaft 25.

The parts 41 to 44 together form a coupled gear 48. The rotary motion of the crak consisting of toothed wheel 41 and pin 42 is transformed to a periodically changing rotary motion of the shaft 45. In the embodiment shown coupled gear 48 is formed as a crank gear with a toothed rack to provide the necessary gear reductions in a simple manner. Thereby the rotary motion of the crak formed by toothed wheel 41 and pin 42 of coupled gear 48 is derived from the rotary motion of the crank formed by worm wheel 21 and pin 22 of the means for transmission of motion 28. To achieve a wiping area according to FIG. 1, the toothed wheel 41 must run through a full rotation, when the worm wheel 21 during half of a wiping cycle rotates through an angle of 180 degrees. Starting from a rest position with a retracted wiper arm, the wiper arm is radially extended once and retracted again in the reversing position during half of a wiper cycle. In wiper systems, in which the entire window pane is to be cleaned by a single wiper, the gear reduction between worm wheel 21 and toothed wheel 41 is determined in such a way that during half of a wiping cycle, i.e., a swivelling angle of 180 degree of the worm wheel 21, the toothed wheel 41 carries out two complete rotations.

Figure 3:
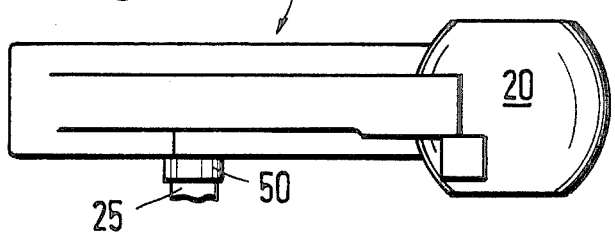
FIG. 3 is a side view of the structural unit of FIG. 2.

From FIGS. 2 and 3 it can be seen that the drive motor 20 is combined to a structural unit 49 with the means for transmission of motion 28 and the coupled gear 48. In FIG. 3 it is additionally indicated that this structural unit is made in one piece with a bearing bush 50, in which the drive shaft 25 is mounted. The guide member, as a whole designated 30, includes a metallic frame 51 and a cover 52 made of plastic material. Frame 51 is mounted on the drive shaft 25 in a manner protected against twisting. A plastic slide 53 displaceable in the direction P, is mounted in frame 51. Slide 53 includes integral fastening means 54 for fastening to a windshieldwiper 55, which has been only partially shown. Windshield wiper 55 can be constructed in the conventional way and includes a wiper arm and a wiper blade which are jointly displaced.

Slide 53 carries a toothed rack 56 as a single piece, toothed rack 56 meshes with a pinion 57 on the shaft 45. Thus as can be seen, especially from FIGS. 2 and 4, the coupled gear 48 is arranged outside the guide member 30 and on the side of the bearing bushing 50 which is opposite to the guide member 30. Furthermore it can be seen that with a swivelling motion of the entire guide member 30 in the same direction the shaft 45 acting upon the slide 53 and mounted in the bore 46 of the drive shaft 25 is driven with changing direction of rotation via pinion 57 and toothed rack 56, so that consequently the slide and thus the entire wiper arm during half a wiping cycle is moved at least once from a retracted position into an extended position and again into the extended position.

As shown in FIG. 5 and described below the motion of slide 53 in the area of the reversing position is damped by spring means. On both sides of the slide 53 a chamber 60 is formed. A pressure spring 63 is supported and held in prestressed condition in each chamber 60 by plates 61 and 62. Frame 51 is proved with rackshaped studs 64 which extend into chambers 60 through bores 65 and then can further prestress the pressure spring 63.

In FIG. 5 the slide is shown in one of its reversing positions. It can be seen that the left-hand studs 64 rest against the plates 61 and that in this reversing position studs 64 have increased the prestress of the pressure spring. If the slide of FIG. 5 is moved to the right, the pressure spring 63 can relax until right-hand stud 64 hits the plates 62 and thus the prestress of the pressure spring 63 is again increased. By this damping of the motion of the slide shortly before it reaches the reversing position noise which results from the change of toothed profiles between pinion 57 and toothed rack 56 is reduced.

Embodiments of the invention can be used for cleaning rectangular headlight lenses, or windshields or the like.

Only one constructive variant of the means for damping the slide motion has been shown. Other alternatives include two springs secured to the housing, of which one each rests against a stop on the slide in the reversing position. The use of two damping springs according to FIG. 5 has the advantage that the slide is strained symmetrically. If only one damping spring is used it should be arranged adjacent to the toothed rack, so that great forces do not act upon the slide transverse to the direction of displacement and cause a canting of the slide in its guide.

What is claimed is:

1. A wiper system comprising:
   a drive motor;
   a windshield wiper;
   a slide coupled to said windshield wiper;
   a guide member for said slide;
   a bearing bushing;
   a drive shaft mounted in said bearing bushing;
   transmission means coupling said drive motor to said guide member whereby said guide member is driven by said drive shaft in pendulum fashion about the longitudinal axis of said drive shaft;
   a coupled gear arranged outside said guide member, said coupled gear being disposed on one end of said bearing bushing and said guide member being disposed on the other end of said bearing bushing;
   said drive shaft having a longitudinal bore;
   a second shaft extending through said bore and operatively connected to said slide;
   said coupled gear being operative to rotate second shaft to thereby cause said slide to move radially inward and outward.

2. A wiper system in accordance with claim 1, wherein said coupled gear is combined as a structural unit with means for transmission of motion for driving the guide member in pendulum-fashion and said drive motor.

3. a wiper system in accordance with claim 1, wherein:
   said coupled gear includes a crank gear comprising a first crank driven by said electric motor in the same direction of rotation.

4. A wiper system in accordance with claim 3, wherein:
   said crank gear includes a push rod formed as a toothed rack which meshes with a pinion, said pinion being connected in a manner protected against twisting with said second shaft.

5. A wiper system in accordance with claim 3, wherein:
   said means for transmission of motion includes a crank mechanism with a crank rotating in one direction of rotation and that the rotary motion of said first crank is derived from the rotary motion of a second crank.

6. A wiper system in accordance with claim 1, wherein:
   said second shaft carries a pinion in said guide member and said pinion co-operates with a toothed rack fixed on the slide.

7. A wiper system in accordance with claim 6, wherein:
   said toothed rack and said slide are injection-moulded from plastics material as a single piece.

8. A wiper system, in accordance with claim 1, comprising:
   spring means for damping motion of said slide in the area of reversing positions.

9. A wiper system in accordance with claim 8, wherein:
   said slide has at least one prestressed pressure spring in a chamber, and said guide member includes studs arranged to increase the prestress of a pressure spring shortly before said slide resaches its reversing position.

10. A wiper system, in accordance with claim 1, comprising:
    a second wiper serving to clean a common window pane, with said windshield wiper, only said wiper being retracted and extended in the radial direction during its motion in pendulum-fashion.

* * * * *